Dec. 14, 1943.  J. D. LANGDON  2,336,486
CHECK VALVE SEALING MEANS
Filed Oct. 16, 1941
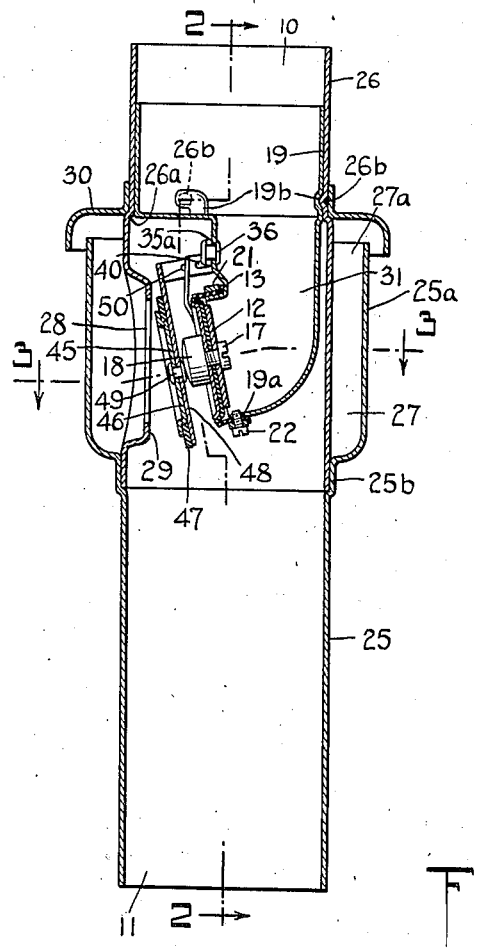
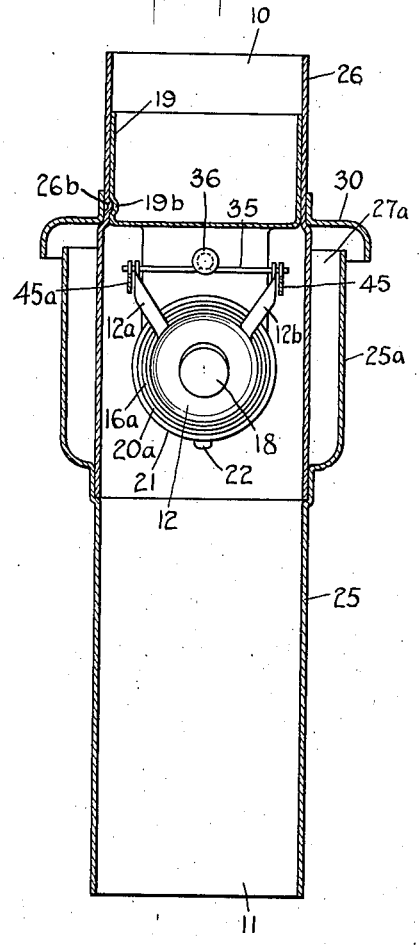
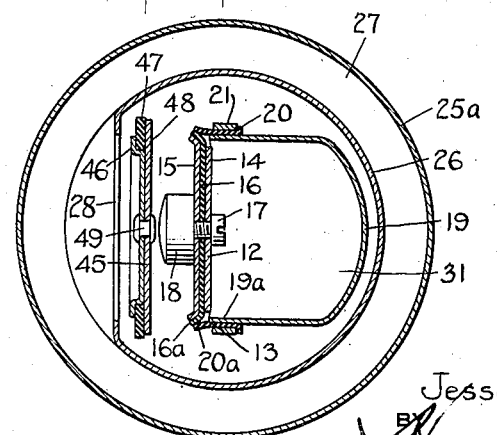
INVENTOR
Jesse D. Langdon
HIS ATTORNEY Patented Dec. 14, 1943

2,336,486

UNITED STATES PATENT OFFICE 2,336,486

CHECK VALVE SEALING MEANS

Jesse D. Langdon, Los Angeles, Calif.

Application October 16, 1941, Serial No. 415,165

5 Claims. (Cl. 137—69)

This invention relates to sealing means for check valves, and has particular value as applied to vacuum breakers designed to prevent backflow in plumbing systems.

An object of the invention is to provide means whereby a very tight closure of a check valve is possible by the application of relatively small force.

A preferred feature in the attainment of the above object resides in the provision of mutually cooperative and concentric, flexible, resilient lips circumferentially about a flap type of check valve and about its seat, respectively, one of the lips being of tubular formation, and the other being backwardly divergent, and preferably rigidly backed, so as to wedge within the first when the two lips come together in the closing of the valve.

Another object is to provide an arrangement of the check valve sealing means in a syphon breaker, or back-pressure control device, such that the advantageous characteristics thereof will be very effectively utilized.

An additional object is to provide a construction of syphon breaker, or back-pressure control device, such that the check valve means thereof is positively effective both to control the flow of liquid therethrough and to open and to tightly close the air vents thereof.

Further objects and features will be apparent from the following detailed description of the specific embodiment illustrated in the accompanying drawing.

In the drawing:

Fig. 1 represents a vertical section taken centrally through a preferred embodiment of the invention as incorporated in a syphon breaking device;

Fig. 2, a view corresponding to that of Fig. 1, but taken at right angles thereto, illustrating the flap type of check valve in front elevation; and Fig. 3, an enlarged horizontal section taken on the line 3—3, Fig. 1, the check valve being illustrated as though it were in exactly vertical position when the section was taken.

The sealing means of the invention may be incorporated in a variety of check valve structures designed for various purposes, but the characteristics thereof are especially advantageous in connection with syphon breaking devices. Accordingly, the specific embodiment here illustrated and described discloses sealing means, per se, as employed with flap types of check valves, and, also the combination of such sealing means and check valves with other structural elements to provide very effective forms of syphon breaking devices for use wherever such devices are employed, usually in plumbing systems serving sanitary fixtures.

In the embodiment of Figs. 1, 2 and 3, the sealing means of the invention are associated with check valve structure which is here disposed within a casing of tubular formation, having an inlet 10, adapted for connection with supply piping of a plumbing system, and an outlet 11, adapted for connection to outlet piping or to the supply end of a plumbing fixture.

The check valve structure includes a preferably circular flap valve element 12 which hangs pendent within the valve casing, between the inlet 10 and the outlet 11 thereof, for swinging movement toward and away from the valve seat 13.

The flap valve element 12 comprises a circular face plate 14, a circular backing plate 15, having its circumferential edge 15a formed backwardly divergent, and a circular, flexible, resilient diaphragm 16, advantageously rubber, interposed between the face plate and backing plate and protruding circumferentialy from the edge of the face plate. The face plate, backing plate, and interposed diaphragm are held together, preferably, by means of a screw 17, which passes through an aperture provided centrally of the combination and threads into a counter-weight 18 functioning as a nut. The circumferential margin of the diaphragm 16 is preferably configurated backwardly divergent similarly to the circumferential margin of the backing plate 15, thereby forming a backwardly divergent, flexible, resilient lip 16a circumferentially of the flap valve element.

The valve seat 13 is of tubular configuration for receiving and seating the flap valve element 12. It is here provided at the lower, discharge end 19a of a tubular insert element 19. A length of flexible, resilient tubing 20, advantageously rubber, is secured to the discharge end 19a of tubular insert element 19, as by means of a ring 21, screwed into place, as at 22. The tubing 20 protrudes outwardly from the discharge end 19a and provides a flexible, resilient lip 20a of tubular configuration adapted to receive and seat the circumferential, flexible, resilient lip 16a, which wedges thereinto. Because of the nature of the two cooperating lips 16a and 20a, a very effective and tight wedge fit is readily obtained between the flap valve element 12 and the seat 13.

The tubular casing which houses the valve mechanism here comprises a lower tube 25, having an upper bell end 25a, shouldered, as at 25b, where the bell end joins the main length thereof. The lower end of tube 25 provides the outlet 11, and may have any desired formation adapted for coupling with discharge piping or with a sanitary device or the like. An upper tube 26 fits into the shouldered portion 25b of the tube 25, and, together with the bell end 25a, defines a circumferential air inlet 27. The wall of tube 26 adjacent its lower end, that is, adjacent that end thereof which is within the bell end 25a of tube 25, is pressed inwardly to provide a circular disk formation, which is apertured at 28, providing an air vent, and a circumferential valve seat 29 surrounding the air vent. The aperture or air vent 28 opens directly into the circumferential air inlet 27, and provides communication of the interior of the casing structure with the outside atmosphere through the top opening 27a of the circumferential air inlet.

The tube 26 is shouldered at 26a for receiving the protective cowl 30, which overhangs the circumferential air inlet 27, and is provided with internally extending nubs 26b thereat for anchoring the tubular insert element 19. Such tubular insert element 19 is configurated at its upper end to fit snugly within the upper part of tube 26, and is abruptly reduced in horizontal cross-section intermediate its length to provide a depending leg which defines a flow passage 31 and terminates in the discharge end 19a with which the valve seat 13 is associated. The upper part of the tubular insert element 19 is provided with external bayonet grooves 19b which serve to receive and to interlock with the nubs 26b of the tube 26 when such element 19 is inserted into the latter.

It should be noted that the lower part of the tubular insert element 19 curves so as to locate and direct its circular discharge end 19a, and the discharge orifice defined thereby, substantially laterally within the valve casing and substantially directly opposite the air vent 28 of the tube 26.

The flap valve element 12 is suspended from the tubular insert element 19, and, for this purpose, a transversely extending, light weight shaft element 35 is secured to the depending leg portion of such element 19. Such shaft element advantageously has an eye 35a formed at its middle, and is secured to the insert element 19 by means of a rivet 36.

Arms 12a and 12b extend from the flap valve element 12, preferably directly from the backing plate 15. They extend backwardly of the valve element, leaving ample clearance about the circumferential lip 16a, and are bent around at their upper ends to provide ears for engaging opposite ends of the shaft 35, see Fig. 2. These upper ends or ears of the arms 12a and 12b are each provided with an elongated slot, see 40, Fig. 1, and the slots thus provided receive the ends of shaft 35, affording translational movement toward and away from the depending leg of tubular insert 19, as well as pivotal movement on the shaft 35. Accordingly, the flap valve element 12 is allowed ample leeway for proper seating on its seat 13 in the closing of the lower end of the flow passage 31. The flap valve element 12 seats under the influence of gravity, the center of gravity being through the counter-weight 18.

It is desired that means be provided for closing the air vent 28 when the flap valve element 12 is open and allowing liquid to discharge into the lower part of the tubular casing. For this purpose, a flap valve element 45 is suspended from the shaft element 35, being disposed adjacent the flap valve element 12 so as to be influenced directly by the opening and closing movement thereof.

The flap valve element 45 here comprises a face plate 46 having its mid portion depressed to form a rearward circumferential groove, which serves to receive a flexible, resilient seating annulus 47 of rubber or like material. A backing plate 48, united securely to the base plate 46 by means of the rivet 49, holds the annulus 47 in place. Arms 45a and 45b, somewhat similar to the arms 12a and 12b of the flap valve element 12, extend upwardly from the backing plate 48, and have their upper ends also bent around to form ears for engaging opposite ends of the shaft element 35. Each ear is provided with an elongated slot, see 50, Fig. 1, and the slots thus provided serve to receive the opposite ends of shaft 35, affording translational movement toward and away from the valve seat 29, as well as pivotal movement, for the flap valve element 45. The flap valve element 45 and the elements serving to suspend the same within the tubular casing, as aforedescribed, are so arranged as to be influenced by gravity to normally maintain such valve element in open position, as shown in Fig. 1.

In the operation of this syphon breaking device, liquid flowing through the inlet 10 and down through flow passage 31, exerts pressure against the flap valve element 12, and opens the same, permitting discharge into the lower part of the casing structure and out through the outlet 11. Opening of the flap valve element 12 coincidently closes the flap valve element 45, and maintains it closed until flow of liquid ceases or until suction in the main supply line causes back pressure. In the first instance, the flap valve element 12 will automatically swing closed against its seat 13 under the influence of gravity and, likewise under the influence of gravity, the flap valve element 45 will open. In the last instance, the back pressure, aided by gravity, will forcibly swing the flap valve element 12 into closed position on its seat 13, and will also exert a positive opening influence on flap valve element 45 in addition to the force of gravity.

It should be noted that the coacting lips 16a and 29a are adapted for very efficient cooperation in their closing action, being effective to create a very tight seal by reason of the wedge relationship therebetween.

Whereas, this invention is illustrated and described with reference to a preferred specific embodiment thereof, it should be understood that various changes may be made in such specific embodiment, and many other embodiments may be constructed, by those skilled in the art without departing from the spirit and generic scope of the invention as set forth herein and in the claims that here follow.

I claim:

1. A device of the character described, including, in combination, a flushing valve construction having a vent opening, a conduit in said construction terminating in an outlet directed toward said vent opening, a pivotally supported conduit closure, a vent closure pivotally supported independently of said conduit closure, common pivot means for pivotally supporting both said closures independently, said vent closure being mounted to swing under gravity out of vent closing position, and gravity actuated means tending to swing said conduit closure into closing position.

2. A device of the character described, including, in combination, a flushing valve construction having a vent opening, a conduit in said valve terminating in an outlet, a conduit closure, a vent closure, separate extensions for each of said closures, said extensions each having a slot, a pivot pin supported by said conduit and passing through all of said slots, said vent closure being mounted to swing under gravity out of vent closing position, and gravity actuated means tending to swing said conduit closure into closing position.

3. A device of the character described, including, in combination, a flushing valve element having a vent opening, a conduit in said element terminating in an outlet directed toward said vent opening, a pivotally-supported conduit closure, a pivotally supported vent closure, common pivot means from which both said conduit closure and said vent closure are pivotally supported and on which said closures may rotate jointly and severally, said vent closure being mounted to swing under gravity out of vent closing position, and gravity actuated means tending to swing said conduit closure into closing position.

4. A device according to claim 1, in which the outlet of said conduit has a valve seat comprising a collar of relatively thin expansible material and the conduit closure comprises the combination of a thin disc of thin flexible material unsupported about its periphery and a rigid backing plate for said disc and of substantially the same diameter thereof, said backing plate having a rigid rim extending rearwardly at an acute angle with respect to the plane of the plate to limit the extent of rearward flexing of the peripheral portion of said thin disc.

5. In a valve, a pivotally mounted valve closure comprising a rigid element having a rim portion extending rearwardly at an acute angle with respect to the plane of the face of the element, and a valve disc member of substantially the diameter of said rigid element secured thereto at substantially its central portion, said valve disc having a thin, flexible rim substantially coextensive with the rim of the rigid element; and a valve seat comprising a thin tube of expansible material having a diameter less than the diameter of said valve disc; said valve closure being weighted and pivoted to swing by gravity to bring the flexible rim of the valve disc into engagement with the flexible valve seat to expand the same outwardly in contact with the flexible rim of the valve disc while deflecting said flexible rim rearwardly to the extent permitted by the rim of said rigid member.

JESSE D. LANGDON.

DISCLAIMER 2,336,486.—*Jesse D. Langdon*, Los Angeles, Calif. CHECK VALVE SEALING MEANS. Patent dated December 14, 1943. Disclaimer filed February 14, 1945, by the inventor.

Hereby enters this disclaimer to claims 1, 2, and 3 of said patent.

[*Official Gazette March 13, 1945.*]